United States Patent [19]

Zilberman et al.

[11] Patent Number: 5,286,231
[45] Date of Patent: Feb. 15, 1994

[54] FLEXIBLE ELASTOMER COUPLING ELEMENT

[75] Inventors: Jossef Zilberman, Randallstown; Robert E. Munyon, Columbia; Sujen Chen, Ellicott City, all of Md.

[73] Assignee: Kop-Flex, Inc., Baltimore, Md.

[21] Appl. No.: 857,988

[22] Filed: Mar. 26, 1992

[51] Int. Cl.$^5$ .............................. F16D 3/78
[52] U.S. Cl. ........................ 464/93; 464/147
[58] Field of Search ............... 464/87, 88, 89, 92, 464/93, 98, 147

[56] References Cited

U.S. PATENT DOCUMENTS

| | | | |
|---|---|---|---|
| 1,455,242 | 5/1923 | Corgiat, Jr. et al. | |
| 2,580,781 | 1/1952 | Hoffer | 64/12 |
| 2,754,667 | 7/1956 | Boschi | 64/11 |
| 2,761,298 | 9/1956 | Jarvis | 464/88 |
| 2,998,717 | 9/1961 | Schwenk | 64/11 |
| 3,296,827 | 1/1967 | Landon et al. | 64/11 |
| 3,362,191 | 1/1968 | Louette | 64/11 |
| 3,368,833 | 2/1968 | Chung | 287/52.06 |
| 3,393,504 | 7/1968 | Dodge, Jr. | 57/144 |
| 3,396,556 | 8/1968 | Giegerich | 64/14 |
| 3,410,112 | 11/1968 | Gawreliuk | 64/13 |
| 3,425,240 | 2/1969 | Feller et al. | 64/11 |
| 3,683,643 | 8/1972 | Kirschey | 64/11 R |
| 3,698,208 | 10/1972 | Williams | 64/11 R |
| 3,731,499 | 5/1973 | Morlon | 64/11 R |
| 3,793,849 | 2/1974 | Downey | 64/13 |
| 3,798,924 | 3/1974 | Downey | 64/13 |
| 3,837,179 | 9/1974 | Barth | 64/14 |
| 3,859,821 | 1/1975 | Wallace | 64/11 R |
| 4,019,345 | 4/1977 | Fukuda | 64/12 |
| 4,019,346 | 4/1977 | Fukuda | 64/12 |
| 4,034,575 | 7/1977 | Barth | 64/14 |
| 4,182,139 | 1/1980 | Hornig et al. | 64/12 |
| 4,228,664 | 10/1980 | McCoy | 64/14 |
| 4,241,593 | 12/1980 | Matyl et al. | 64/14 |
| 4,353,704 | 10/1982 | Corey | 464/72 |
| 4,380,442 | 4/1983 | Amsel | 464/93 |
| 4,395,245 | 7/1983 | Carlson | 464/49 |
| 4,428,738 | 1/1984 | Loubier | 464/93 |
| 4,473,359 | 9/1984 | Davis | 464/88 |
| 4,634,400 | 1/1987 | Butzow et al. | 464/88 |
| 4,714,450 | 12/1987 | Byrnes et al. | 464/90 |
| 4,734,081 | 3/1988 | Neathery et al. | 464/71 |
| 4,768,992 | 9/1988 | Mancuso et al. | 464/69 |
| 5,163,876 | 11/1992 | Zilberman et al. | 464/93 X R |

FOREIGN PATENT DOCUMENTS

| | | | |
|---|---|---|---|
| 879787 | 6/1953 | Fed. Rep. of Germany | 464/92 |
| 1078821 | 11/1957 | Fed. Rep. of Germany | 464/93 |
| 1211038 | 2/1966 | Fed. Rep. of Germany | 464/93 |
| 2153383 | 5/1973 | France | |

OTHER PUBLICATIONS

Roark, R. J. et al. Formulas for Stress and Strain, Fifth Edition (McGraw-Hill Book Company) 1975.

*Primary Examiner*—Clifford D. Crowder
*Assistant Examiner*—John J. Calvert
*Attorney, Agent, or Firm*—Cushman, Darby & Cushman

[57] ABSTRACT

A flexible member for coupling a driving member to a driven member is an elastomer element formed with a plurality of integrally formed segments of tapering cross sectional area and is provided at the intersections of the segments with connecting elements for connecting the flexible member to the driving and driven members; the connecting element is formed in a manner that prevents rotation of the elastomer member relative to each point of connection; the segments of the flexible member are shaped in such a manner to maximize resistance to deformation under the influence of torque loading and misalignment.

21 Claims, 5 Drawing Sheets

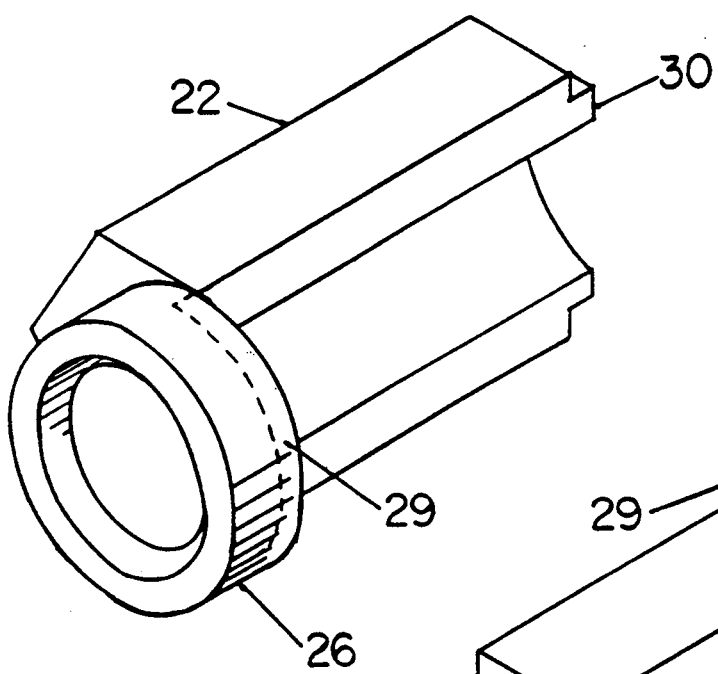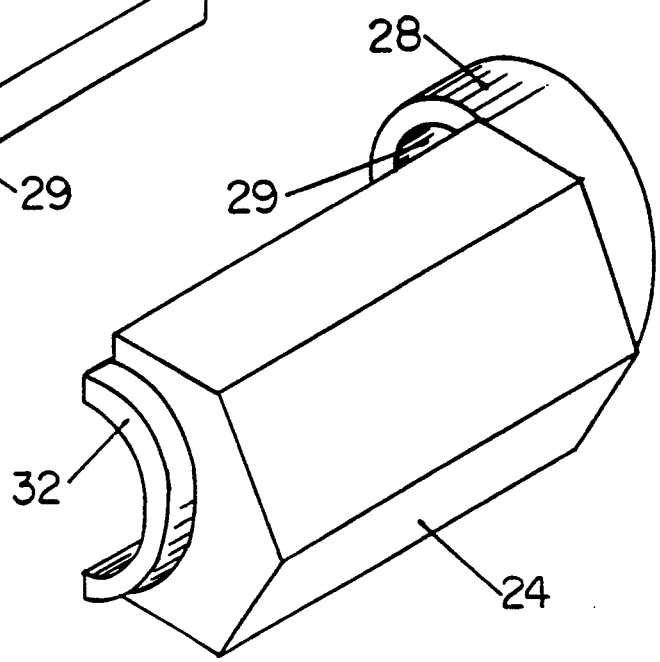

FLEXIBLE ELASTOMER COUPLING ELEMENT

BACKGROUND OF THE INVENTION

1. Field of the Invention

The present invention relates to flexible coupling members between driving and driven elements such as shafts, which must accommodate misalignment and torque in use and which preferably can be installed rapidly and accurately.

2. Background of the Invention

The prior art includes a great variety of shaft coupling devices intended to compensate for misalignment and to transmit torque over a desired range. In constructing such devices, one of the primary considerations involves the magnitude of the torque to be transmitted through the coupling, as this quantity most directly affects the durability of the coupling. In a number of prior art coupling structures, only a very narrow range of torque magnitudes can be accommodated. Thus, for example, where only low speed and correspondingly low torque levels are to be encountered, the coupling designs have not required or utilized the relatively heavy metallic disc elements in the coupling. Conversely, for relatively high speed and large torque loads, the designs have been correspondingly more robust, using the principles of multi-layered flexible discs of high grade steel, such as disclosed in U.S. Pat. No. 4,768,992 to Mancuso et al. While these latter types of couplings have exhibited sufficient durability and flexibility in use, the cost and the difficulty in manufacturing and installing them have been a disadvantage particularly in view of the relatively narrow field of use in which they can be economically employed. Other types of couplings, such as shown in U.S. Pat. No. 4,428,738, while somewhat less costly to manufacture than the metal couplings, indicate a low torque load capability due to the unavoidable distortion in use under certain loads.

SUMMARY OF THE INVENTION

The present invention provides a shaft coupling member which can be manufactured much less expensively, is capable of rapid installation, is lighter in weight and will be at least as durable as couplings of the prior art while accommodating comparable or even greater torque loads, misalignment levels and larger relative shaft diameters. Further, by virtue of the cost advantage afforded, the coupling of the present invention will be usable in a much wider range of applications than the couplings of the prior art.

In a preferred embodiment, the coupling member is made with an elastomeric material, such as rubber or polyurethane, which can be easily formed to a selected size to accept a variety of differently sized linking configurations. The coupling member generally takes the form of an open planar polygon, with radial width and axial thickness, so as to eliminate relative rotation about the connections to the facing flanges of the shafts to be coupled or, if used, an intermediate coupling member such as a spacing piece disposed between the shaft flanges.

The type of coupling member described herein features an even number of segments (links). Under torque loading, half of the links (every other one) would be subjected to compression, and the other half would be subjected to tension. For an optimized design, both the compression and tension links should share the torque related forces. Due to the specific properties of elastomers, the compression links contribute to torque transmission by a much higher percentage than the ones subjected to tension.

On the other hand, links in compression have a tendency to buckle and distort radially, inward or outward, drastically limiting their capacity to participate in torque transmission. In such a condition, the tension links are forced to accommodate almost the entire torque related forces. As a result, the tension link stresses would increase substantially, which may lead to premature failures in conventional elastomer couplings.

The shape of the coupling member is designed to minimize or, preferably, to entirely avoid inward and outward radial distortion or flexing of the elastomeric material. To achieve this, each of the coupling links (body portions or segments between each embedded connection bushing of a special type described below), is shaped to have a neutral axis or locus of points that, when the coupling is unstressed, lies within an envelope bounded by an outer arc extending from the center of one connection bushing to the center of an adjacent connection bushing and an inner arc extending between the same points as the outer arc but having a larger radius of curvature. In some applications, the inner arc may be a straight line. In conventional stress analysis, the neutral axis is defined as a line of zero fiber stress in any given section of a member subject to bending. For substantially all operating conditions, this neutral axis will lie within the previously described envelope, bound by two arcs. This feature is attained, according to this invention, by reducing the body mass of each body segment in both a radial and an axial direction by tapering the body segments as described herein. This structure together with the non-rotational, non-sliding connection of the bushing means can be rapidly reproduced using standard molding technology well known in handling elastomeric materials once the desired structure is developed as in the present invention. In general, in the preferred embodiment, each segment is formed by molding so that each smoothly tapers in the radial width dimension and the axial thickness dimension such that the middle of the segment is narrower than the ends. In some applications, the tapering may only be required in either the axial or the radial direction. The ratio of the transverse dimension at the ends of the segment to the dimension at the middle preferably ranges from 1.15 to 2.85 in either instance.

Since the segments of the coupling of this invention are molded as one piece from an elastomeric material such as rubber or polyurethane, the desired non-rotational connection bushings or elements are first located in a mold relative to the article to be molded in precise positions to correspond to the desired intersection with respect to the desired positioning of the neutral axis of each body portion or segment of the coupling. The molding operation is then carried out with body segments having the shape selected to locate the neutral axis in the desired position as described above. As one result, the tendency of the body portions in use to buckle or flex inwardly or outwardly is further minimized. As a consequence, it is believed that the coupling of this invention will be able to handle significantly greater torque loads than the elastomeric shaft couplings of the prior art and surprisingly still exhibit more flexibility so as to accommodate misalignment of the shafts being coupled.

BRIEF DESCRIPTION OF THE DRAWINGS

A better understanding of the present invention and its advantages will result from studying the following detailed description of a preferred embodiment together with the accompanying drawings in which:

FIGS. 7A AND 7B are perspective illustrations of another embodiment of the connection bushings used in the present invention.

DETAILED DESCRIPTION OF THE PREFERRED EMBODIMENT

The invention will now be fully disclosed with reference to the drawings. Specific examples are provided for illustrative purposes, and no limitation should be construed as to the scope of the invention.

Figure 1:
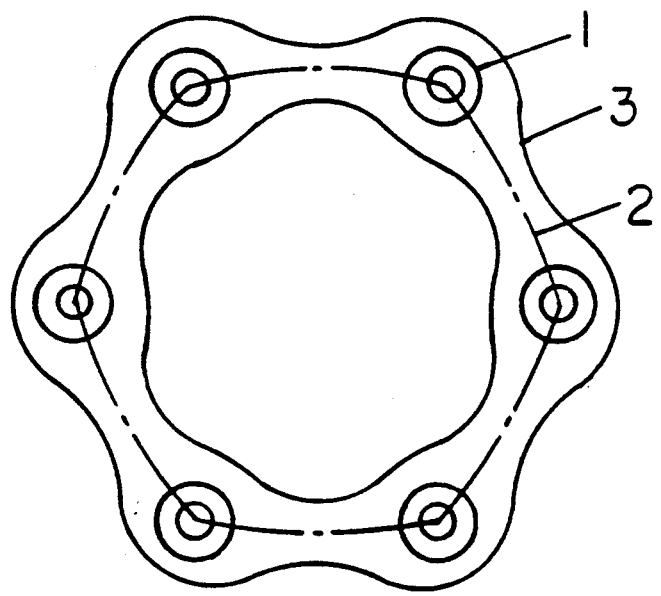
FIG. 1 is a view in elevation of one embodiment according to the present invention with six integrally molded component segments.

It should by borne in mind that the preferred embodiment of the present invention relates less to the specific number of segments used than on the shaping of the segments and the manner in which the coupling member is attached to the members which it is intended to connect. One possible embodiment of the present invention is depicted in FIG. 1, having six component segments 3 integrally molded as one piece which are symmetrical relative to the central axis A. Connecting means 1, useful for connecting the device to a driving and a driven member, are shown at the intersections of the segments 3. The neutral axis of each segment is illustrated by the dotted line 2 extending along each segment between their intersections. It can be generally seen that the width of the component segments 3 continuously tapers so that each segment is narrower at its middle than at its ends. This has been found to be advantageous in operation with respect to enhanced flexibility and uniformity of stress distribution.

Figure 2:
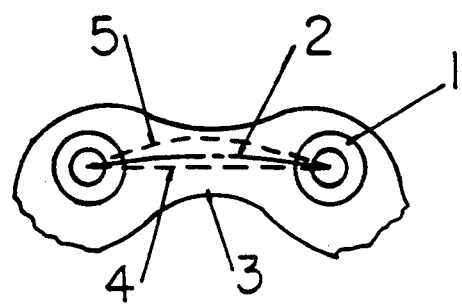
FIG. 2 is a detailed view of one of the segments of the body of the present invention.

FIG. 2 depicts one of the identical component segments 3 of the present invention. The lines extending between the connecting means 1 illustrate the neutral axis 2 of the segment as well as the region or envelope within which it is desired to confine the neutral axis according to the present invention which is due to the shape of each segment and the specific connection device used to mount the coupling to the associated shafts, as explained below. The region or envelope lies within an outer arc 5, which may be the pitch radius on which lie the centers of the connection means 1. Thus, the ends of each arc 5 coincide with the centers of the connecting means 1 at opposite ends of each body segment 3. An inner arc line 4 defines the other boundary of the region and has the same end points as the outer arc 5. As noted above, the inner arc may be a straight line extending between the centers of the connecting means 1.

Figure 3:
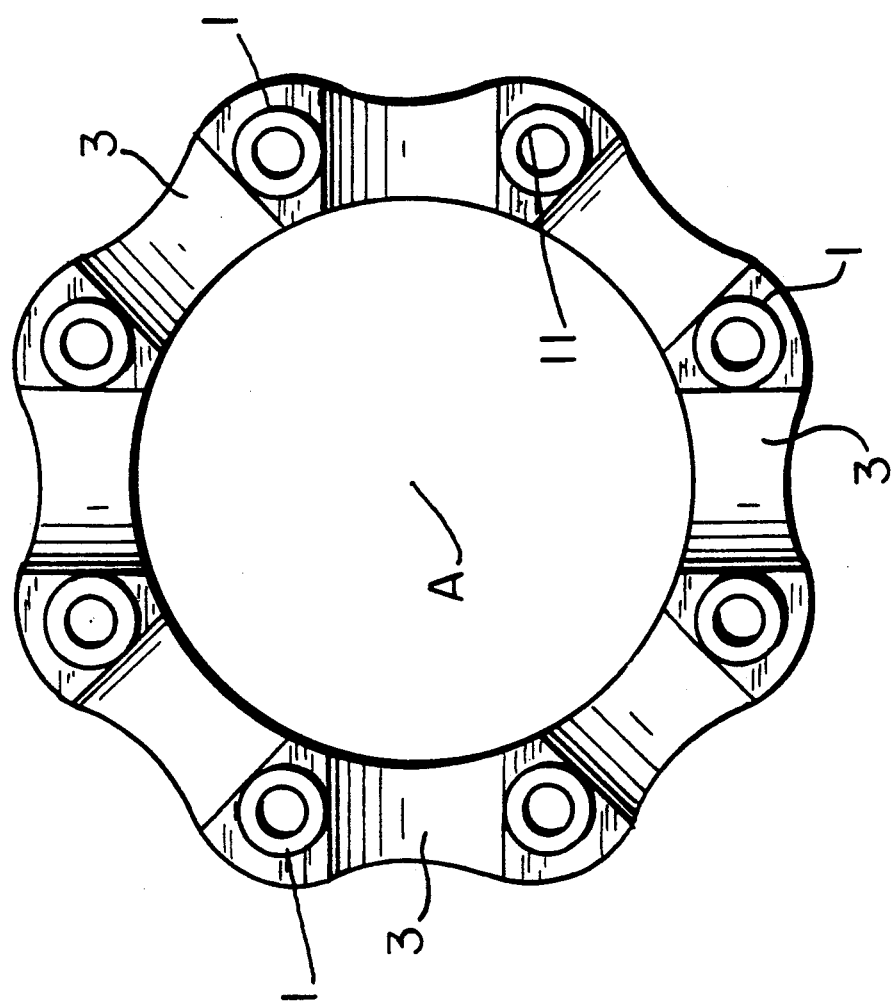
FIG. 3 is another view in elevation of another embodiment according to the present invention with eight component segments which are individually formed.

FIG. 3 is an axial view of another preferred embodiment of the present invention. This embodiment has eight component segments 3, as opposed to the six segments shown in FIG. 1. The continuous tapering or narrowing of the radial width of the segments 3 can be seen here. Again, a metal connection device such as the wedge shaped plug member 1 having a bore is used at the intersections of segments 3 and serves to join the ends of each segment 3 by adhesive bonding of the respective ends to the opposite sides of each connection device 1. The wedge shaped member has sides that diverge in a radial direction. A number of ester based, polyester and elastomeric adhesives are available for this purpose. Each device 1 has a central through bore 11 for receiving a pin or bolt provided on the facing flange of each shaft to be coupled. Each device 1 is essentially a bushing having an axis extending perpendicular to the plane of the elastomeric components segments 3 whereas in the FIGS. 5 and 6 embodiment, the bore 7 in the bushing 10 extends parallel to the plane of the elastomer member. By appropriately tightening the connection with a nut or other retaining device, relative rotation of the devices 1 relative to the pin or bolt may be eliminated to reduce any flexing in a radial direction of the adjacent segments 3.

Figure 4:
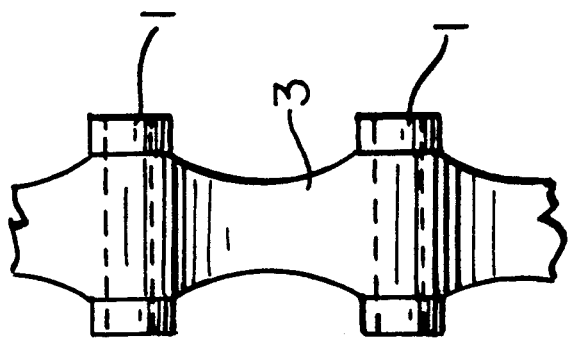
FIG. 4 is a side view of one of the segments of the embodiment illustrated in FIG. 3, taken along line IV—IV.

FIG. 4 is a side view, with parts broken away, of a segment of the embodiment shown in FIG. 3. In this view, the manner in which the axial thickness of each of the segments 3 continuously and smoothly tapers or narrows at its middle can be seen.

Figure 5:
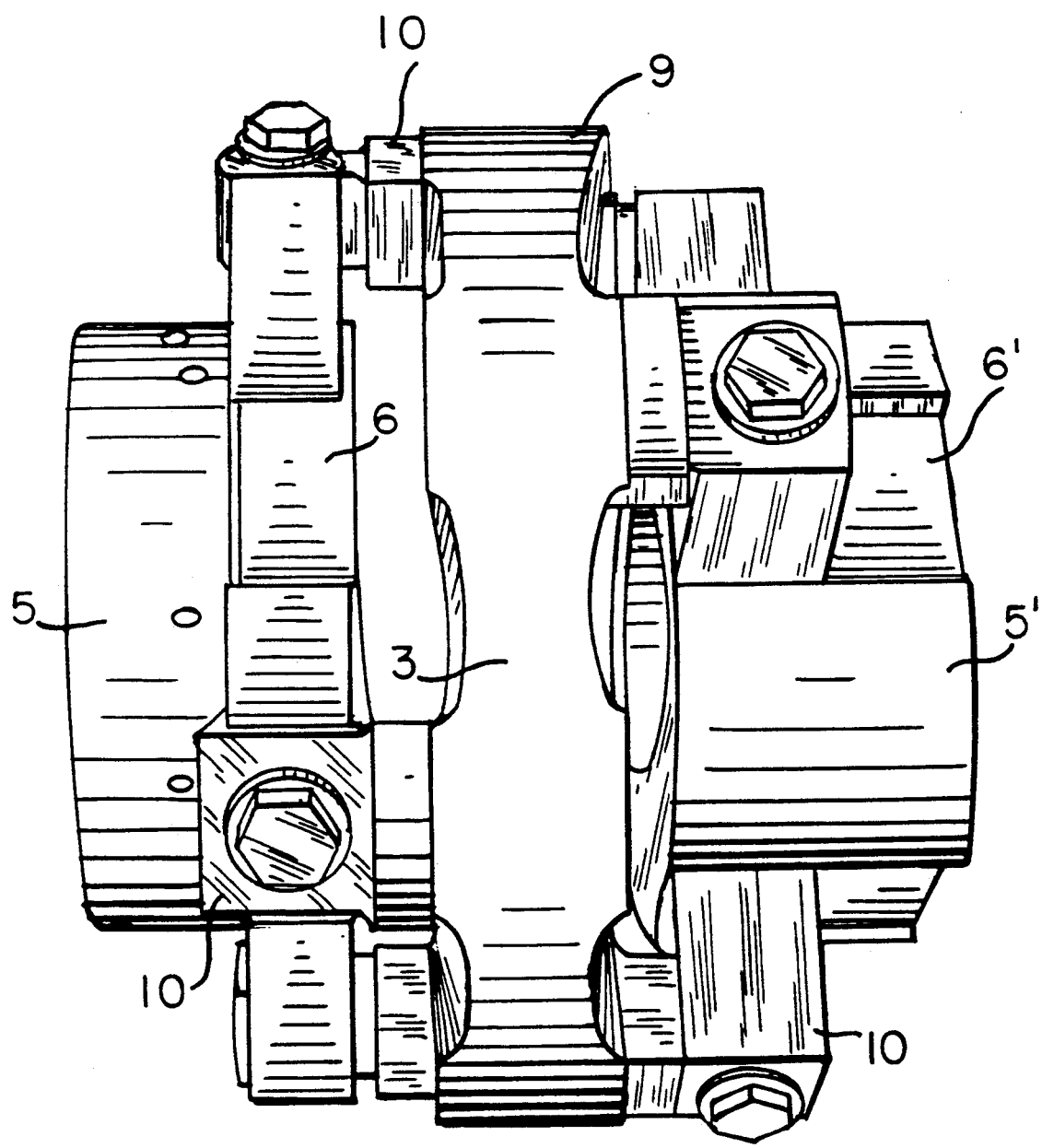
FIG. 5 is a perspective, side view of the preferred embodiment according to the present invention for the connecting means for connecting the flexible coupling member to the driving and/or driven member.
Figure 6:
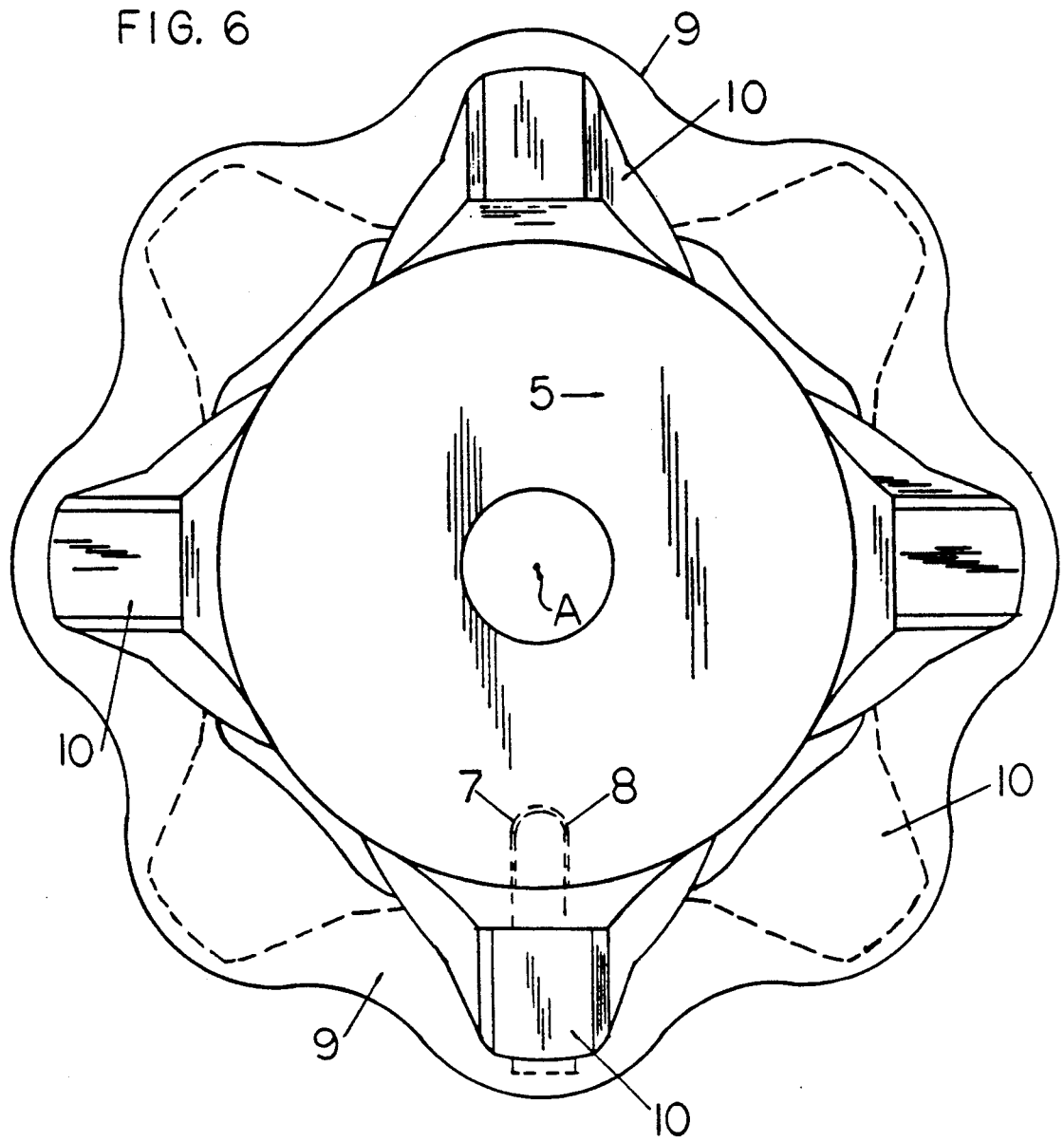
FIG. 6 is an end view of the coupling of FIG. 5.

A preferred embodiment of the coupling shape 9 and connecting devices 10 are shown in FIGS. 5 and 6. FIG. 5 is a side view illustrating driving and driven members 5 and 5', respectively, to be coupled by the present invention. The members 5, and 5' have an annular groove 6 and an axial groove 6', respectively, formed therein adjacent to the end at which each is coupled to the other member. As shown in FIG. 6, the grooves are further provided with bores 7 to receive a connecting pin member or the usual threaded bolt 8 so as to enable attachment of the elastomer coupling element 9 to the members 5, 5'. The pin member 8, preferably a threaded bolt, is carried in a bore 7 either fixedly as by force, a weld or the like or by a threaded connection provided in the specially-shaped connecting member 10, preferably formed from a suitable metallic material, which can be inserted into a mold for the member 9 and adhesively bonded to the elastomer member 9 during the molding operation. The end of the member 10 from through which the pin member or threaded bolt 8 extends is formed so as to fit within the grooves 6 and 6'. FIG. 6 is an axial view seen from an end of one of the members 5 or 5' and illustrates the continuous radial tapering of each body segment 3 as in the previous embodiments. From FIGS. 5 and 6, it can be seen that of any pair of adjacent connectors, one connector is attached to one of the members 5, while the other connector is attached to the other member 5'. With this type of connection device 10, with its end placed in the grooves 6 or 6' of the shaft flanges 5, any relative rotation or sliding motion between the body segments 3 of the coupling 9 and connection devices 10 is positively prevented.

In FIGS. 7A and 7B, there is shown another embodiment of the connecting means in the form of a split sleeve having one half 22 shown in FIG. 7A and the mating half 24 in FIG. 7B. Each of the half sleeves 22 and 24 have preferably non-round exterior sides to afford more surface area to thereby attain improved adhesive bonding of the sleeves when assembled with respect to the elastomer element when the sleeves are imbedded in the element. One end of each sleeve is provided with a ring portion, 26 for half 22, and ring portion 28 for half 24. The end opposite the respective rings are formed with semi-circular projections 30 and 32, respectively, which have a radial dimension to permit each semi-circular projection to be inserted into a semi-circular recess 29 formed on the interior side of each ring of the other half sleeve for assembly. Thus, each split sleeve has one end and an opposite end portion with the associated ring attached to a first and fourth end portion of two split sleeves and the other ring attached to the second and third end portions of the same split sleeves when assembled. The sleeve halves may be affixed by an adhesive to the ends of respective elastomer segments and then the sleeve halves are assembled and a bolt is passed through the cylindrical opening provided. The bolt will serve to attach the sleeve and elastomer element to the drive and driven members in an alternating manner, as is standard in this field.

Other useful features, such as splitting one of the connection devices 1 or 10, shown in FIG. 3, for ease of manipulation, are well-known to those skilled in the art, and can be incorporated into the flexible coupling member of this invention.

In summary, it is believed that the present invention represents a significant and comprehensive improvement over the prior art in this field. The utilization of an elastomer coupling member, formed according to the structure disclosed herein, leads to weight savings, ease of manufacture, ease of operational use, and operational durability comparable or superior to similar coupling members currently in use.

We claim:

1. A flexible coupling member for coupling a driving member to a driven member comprising an elastomer element substantially formed into a plurality of connected segments extending parallel to a plane and substantially symmetric to a central axis extending perpendicularly therethrough, said connected segments having a radial width and an axial thickness so as to generally form an open generally planar polygon, said elastomer element being provided at each of the intersections of said connected segments with a connection means for connecting said flexible member to said driving and driven members, said connection means preventing rotation of said connected segments relative to each said connection means, each said connected segment having opposite ends each fixed to a said respective connection means and a body extending between said opposite ends with the thickness of said body tapering continuously from said ends toward a minimum thickness at a middle portion thereof disposed between said opposite ends in at least one of a radial and axial direction, wherein each said segment has a radially inner and outer surface and an outward curving neutral axis therein, said neutral axis of each said segment being substantially situated in a region defined by an outer arc extending between the centers of each connection means and lying on the pitch radius of said centers of said connection means and an inner locus of points extending between said centers of each connection means and spaced inwardly from said outer arc of said respective segment to prevent relative rotation between a said connection means and an adjacent segment.

2. The invention as claimed in claim 1 wherein said thickness of each segment tapers in both a radial and axial direction.

3. A flexible member as claimed in claim 1, wherein said connecting means are adhesively bonded to each said respective segment.

4. The flexible member as claimed in claim 1, wherein the locus of points is a substantially straight line.

5. A flexible member as claimed in claim 1, wherein each of said segments has a radial width with a ratio of the radial width of said segments at said intersections of said segments to said minimum radial width being between 1.15 and 2.85.

6. A flexible member as claimed in claim 1 wherein each of said segments has an axial thickness with a ratio of the axial thickness of said segments at said intesections of said segments to said minimum axial thickness is between 1.15 and 2.85.

7. A flexible coupling member as claimed in claim 1, wherein said connecting means comprises a bushing inserted at least partly into said elastomer element for attaching said flexible member to said driving and said driven members, said bushing being formed so as to prevent rotation of said elastomer element relative to each said bushing at the point of insertion of each said bushing into said elastomer element, said bushing having an opening for receiving a connecting pin member, said opening having an axis along which said pin member is insertable, said axis of said bushing extending perpendicularly to said plane of said elastomer element.

8. A flexible member as claimed in claim 1, wherein said connecting means comprises a bushing inserted at least partly into said elastomer element for attaching said flexible member to said driving and said driven members, said bushing being formed so as to prevent rotation of said elastomer element relative to each said bushing at the point of insertion of each said bushing into said elastomer element, said bushing having an opening for receiving a connecting pin member, said opening having an axis along which said pin member is insertable, said axis of said bushing extending parallel to said plane of said elastomer element.

9. A flexible member as claimed in claim 8, wherein each said bushing is generally wedge shaped in a radial direction.

10. A flexible member as claimed in claim 8, wherein said bushing is bonded to said elastomer element by adhesive means.

11. A flexible member as claimed in claim 1, wherein each said connecting means comprises a connecting member at least partly disposed within said flexible member, each said connecting member being formed from a metallic material and having a projecting portion having a bore therein for receiving a connecting pin member, said bore having an axis along which the pin member is insertable, wherein said elastomer element is provided with openings at said intersections of said segments of said flexible member into which said connecting members are fixedly inserted, the axis of said bores extending parallel to the plane of said elastomer element, such that said connecting pin members inserted within said respective bores are connectable to driving and driven members.

12. A flexible member as claimed in claim 11, wherein said driving member and said driven member, are provided and which have an end by which they are to be coupled, wherein at least one of said members being coupled is provided with an axial groove adjacent to said end, said projecting portion being formed so as to fit within said axial groove, said axial groove being provided with openings to receive said connecting pin members carried by said projecting portions of said connecting members.

13. The invention as claimed in claim 1 wherein the material of said elastomer element is rubber.

14. The invention as claimed in claim 1 wherein the material of said elastomer element is polyurethane.

15. The invention as claimed in claim 1 wherein said segments are integrally molded.

16. The invention as claimed in claim 1 wherein said coupling member has a first side for facing said driven member and a second side for facing said driving member, said connecting means being distributed around said coupling member in substantially equidistantly spaced relation from each other.

17. The invention as claimed in claim 1 wherein said connection means are each split sleeves each having an axis extending parallel to said central axis.

18. The invention as claimed in claim 1 wherein said connecting means are split to facilitate installation.

19. A flexible coupling member for coupling a driving member to a driven member comprising an elastomer element substantially formed into a plurality of connected segments extending parallel to a plane and substantially symmetric to a central axis extending perpendicularly therethrough, said segments having a radial width and an axial thickness so as to generally form an open generally planar polygon, said elastomer element being provided at each of the intersections of said segments with a connection means for connecting said flexible member to said driving and driven members, said connection means preventing rotation of said connected segments relative to each said connection means, each said connected segment having opposite ends each fixed to a said respective connection means and a body extending between said opposite ends with the thickness of said body tapering continuously from said ends toward a minimum thickness at a middle portion thereof disposed between said opposite ends in at least one of a radial and axial direction, wherein each said connection means comprises a connecting member at least partly disposed within said flexible member, each said connecting member being formed from a metallic material and having a projecting portion having a bore therein for receiving a connecting pin member, said bore having an axis along which the pin member is insertable, wherein said elastomer element is provided with openings at said intersections of said segments of said flexible member into which said connecting members are fixedly inserted, the axis of said bores extending parallel to the plane of said elastomer element, such that said connecting pin members inserted within said respective bores are connectable to driving and driven members, and wherein said driving member and said driven member are provided and which have an end by which they are to be coupled, wherein at least one of said members being coupled is provided with an annular groove adjacent to said end, said projecting portion being formed so as to fit within said annular groove, said annular groove being provided with openings to receive said connecting pin members carried by said projecting portions of said connecting members.

20. The invention as claimed in claim 19 wherein said bores and said openings in said annular groove are threaded and said pin members are threaded bolts.

21. A flexible coupling member for coupling a driving member to a driven member comprising an elastomer element substantially formed into a plurality of connected segments extending parallel to a plane and substantially symmetric to a central axis extending perpendicularly therethrough, said segments having a radial width and an axial thickness so as to generally form an open generally planar polygon, said elastomer element being provided at each of the intersections of said segments with a connection means for connecting said flexible member to said driving and driven members, said connection means preventing rotation of said connected segments relative to each said connection means, each said connected segment having opposite ends each fixed to a said respective connection means and a body extending between said opposite ends with the thickness of said body tapering continuously from said ends toward a minimum thickness at a middle portion thereof disposed between said opposite ends in at least one of a radial and axial direction and wherein said connection means are each split sleeves each having an axis extending parallel to said central axis and wherein each said split sleeve has non-round exterior sides for adhesive bonding to said elastomer element, one split sleeve having a first and second end portions and the other split sleeve having third and fourth end portions, wherein a ring portion is attached to said first and fourth end portions, each said ring having a recess, said first and fourth end portions being at opposite ends of said sleeve when assembled, and a projection is attached to said second and third end portions, said second and third end portions being at opposite ends of said sleeve when assembled, whereby each said projection inserts into said recess and said assembled split sleeves form a bore for receiving a connecting pin member.

* * * * *